United States Patent [19]

Webb

[11] 4,099,930

[45] Jul. 11, 1978

[54] CATALYTIC FUEL ADDITIVE FOR GASOLINE AND DIESEL ENGINES

[75] Inventor: Harry Matthew Webb, Toronto, Canada

[73] Assignee: Natural Resources Guardianship International, Inc., Clayville, N.Y.

[21] Appl. No.: 783,777

[22] Filed: Apr. 1, 1977

[51] Int. Cl.$^2$ ............................................. C10L 1/24
[52] U.S. Cl. ........................................ 44/56; 44/57; 44/67
[58] Field of Search ............... 44/56, 57, 68, 51, 67

[56] References Cited

U.S. PATENT DOCUMENTS

| | | | |
|---|---|---|---|
| 1,677,273 | 7/1928 | Costaguta | 44/56 |
| 1,820,983 | 9/1931 | Loomis | 44/72 |
| 3,282,858 | 11/1966 | Simmons et al. | 44/68 |

FOREIGN PATENT DOCUMENTS

| | | | |
|---|---|---|---|
| 491,648 | 9/1938 | United Kingdom | 44/57 |

*Primary Examiner*—Allen B. Curtis
*Assistant Examiner*—Mrs. Y. Harris-Smith
*Attorney, Agent, or Firm*—John S. Roberts, Jr.

[57] ABSTRACT

An energy-saving fuel additive for gasoline and diesel engines which comprises as active ingredients a catalytic mixture of a major proportion of picric acid and a minor proportion of ferrous sulphate in a combination solvent of alkyl benzene, isopropyl alcohol, and water which optionally may include a minor amount of nitrobenzene. This additive is preferably atomized upon introduction to the engine and may also be added by bulk addition to the fuel container. A preferred solvent for atomized use is isopropyl alcohol, 60% by volume; water, 38% by volume; toluene, 2% by volume. For bulk addition one imperial gallon will contain:

| | Maximum | Range | |
|---|---|---|---|
| Ferrous sulfate | 0.2 g | 0.1 – 0.2 | g |
| Trinitrophenol | 3.5 g | 3.5 – 7.0 | g |
| Nitrobenzene | 0.16 g | 0.1 – 2.0 | g |
| Toluene | 3.37 kg | 3.37 – 1.12 | kg |
| Isopropyl alcohol | 1.12 kg | 1.12 – 3.37 | kg |

A catalytic action occurs in the binary active ingredient due to the presence of the metallic ion $Fe^{++}$ in the composition, causing the slightly heavier and less volatile ends to burn completely, thus increasing the energy and decreasing the emissions of raw hydrocarbons from the exhaust.

10 Claims, No Drawings

CATALYTIC FUEL ADDITIVE FOR GASOLINE AND DIESEL ENGINES

The present invention relates to an energy-saving fuel additive for gasoline and diesel engines which comprises as active ingredients a catalytic mixture of a major proportion of picric acid and a minor proportion of ferrous sulphate in a combination solvent of alkyl benzene, isopropyl alcohol, and water which optionally may include a minor amount of nitrobenzene. This additive is preferably atomized upon introduction to the engine and may also be added by bulk addition to the fuel container. A preferred solvent for atomized use is isopropyl alcohol, 60% by volume; water, 38% by volume; toluene, 2% by volume. For bulk addition one imperial gallon will contain:

|  | Maximum | Range | |
|---|---|---|---|
| Ferrous sulfate | 0.2 g | 0.1 – 0.2 | g |
| Trinitrophenol | 3.5 g | 3.5 – 7.0 | 7.0 g |
| Nitrobenzene | 0.16 g | 0.1 – 2.0 | g |
| Toluene | 3.37 kg | 3.37 – 1.12 | kg |
| Isopropyl alcohol | 1.12 kg | 1.12 – 3.37 | kg |

A catalytic action occurs in the binary active ingredient due to the presence of the metallic ion $Fe^{++}$ in the composition, causing the slightly heavier and less volatile ends to burn completely, thus increasing the energy and decreasing the emissions of raw hydrocarbons from the exhaust.

The prior patented art background for the present invention is set out below.

Relating to picric acid

U.S. Pat. No. 928,803 Selden teaches at column 1 use of picrates of fused ring compounds such as naphthalene in a solvent selected from alcohols, benzene, and acetone.

U.S. Pat. No. 3,294,501 Kawahara notes the use of picric acid at column 1 as a lead appreciator.

U.S. Pat. No. 3,434,814 Dubeck speaks of the reduction of hydrocarbon emission from internal combustion engines by operating the gasoline containing ortho-substituted aromatic nitro compounds and prefers picryl acetate.

Art bearing on ferrous sulfate

U.S. Pat. No. 3,002,826 Norris as an additive incorporates preferably aluminum sulfate and other salts, both inorganic and organic, to reduce vanadium deposition which causes corrosion and deposits.

U.S. Pat. No. 3,348,932 Kukin at column 2 states that a small percentage of iron salts may be used as part of a salt combination as a combustion aid in domestic furnaces, diesel equipment, jet engines, etc., to force combustion of the fuel to final products, such as carbon dioxide and water.

Art pertaining to the solvent

U.S. Pat. No. 914,624 Winand, at page 1, column 2, mentions the use of nitrobenzene as "an oxygen-bearer."

U.S. Pat. No. 1,423,050 Tunison, at column 2, line 103, mentions nitrobenzol or nitrobenzene as an explosion promoter for internal combustion engines and diesel engines.

U.S. Pat. No. 4,002,435 Wenzel illustrates a water-in-oil emulsion of hydrocarbons, water, and an alcohol suitable for injection methods as noted in column 2.

The energy-saving compositions and method of treating fuels set out in the present invention differ from the above-cited prior art. Primarily this invention lies in a novel mixture of active ingredients; namely, picric acid (2,4,6-trinitrophenol) and ferrous sulfate ($FeSO_4$). These constitute the active ingredients of the present composition utilizing picric acid in the majority amount. In a preferred bulk composition, the amount of picric acid in an imperial gallon ranges from 3.5-7.0 grams and the ferrous sulfate 0.1-0.2 grams. Thus, as has been stated as to the thrust of use, the picric acid provides the major oxidizing component of the composition and the ferrous iron in the ferrous sulfate provides the catalytic action. Nitrobenzene is used primarily as a solvent and has a secondary use as an auxiliary oxidant. The active ingredients, as well as the solvents of the present invention, have a unique utility over compositions having other salts in that this composition is compatible with the "catalytic converter" containing platinum and paladium compounds which has been mandatory in the United States for new cars since 1975. Thus, it is an appreciator for "no lead" fuel used in such cars.

COMPONENTS OF THE INVENTION

The Active Ingredients

Picric acid, also known as 2,4,6-trinitrophenol, is used in this invention as a strong oxidizing agent.

Ferrous sulfate is used for catalytic action in combination with the superior amount of picric acid noted above. The $Fe^{++}$ ion is readily oxidized to ferric or reduced to $Fe°$. The compound is included since it represents a metal compound which can be oxidized and then retransformed into the lower oxidized state or first transformed to ferric and then retransformed to ferrous. The presence of the ferrous sulfate salt lends greater activity to the composition than would be expected when considering its minor percentile inclusion in the composition and thus may be viewed as a catalytic agent. Additionally, the combination of picric acid and ferrous sulfate may be termed true synergistic mixture of other additives. In all cases, a catalytic action takes place due to the presence of a ferrous ion in the compound. The slightly heavier and less volatile ends are completely burned, thus increasing the energy and decreasing the emissions of raw hydrocarbons from the exhaust. Without the catalytic complete combustion of the fuel, the heavy ends condense on the comparatively cooler cylinder walls, eventually manifesting themselves as crankcase dilution elements, gum, sludge, etc. Therefore, the addition of the product to the fuel not only increases the energy output but also contributes to the more efficient and longer life of the lubricating oil at the same time giving a clean carbon and gum-free internal combustion engine.

Other Ingredients

Toluene. Of the alkyl benzenes possible, toluene, ortho-, meta-, and paraxylenes are preferred, and the mesitylenes are operable.

Alkanol. Of the lower alkanols which are useful in this invention, methyl alcohol and isopropanol are preferred, although any $C_1$-$C_6$ lower alkanol straight- or branch-chain can be used.

Nitrobenzene. This compound, as in the bulk formulations, is utilized as an additional solvent useful in the bulk formulations. It is miscible with alkanols and is a superior organic solvent for the picric acid.

Water. As to the water additive, a purified water free of extraneous metal ions is preferred, although tap water is operable.

INTRODUCTION OF THE COMPOSITION INTO THE COMBUSTION CHAMBER OF BULK FUEL

The introduction of the composition into a diesel or gasoline bulk container is made in a facile manner by premeasurement and adding the composition based upon the number of gallons in the container. Such bulk addition may be made per imperial gallon by the formulation, range or maximum, set out above.

For atomized use, a preferred modus is to introduce a mixture of alcohol or active ingredients into the motor utilizing a system such as the Harlo MotorKlean Fuel System (manufactured by Harlo Repower Ltd., Clearbrook, B.C., Canada) for direct injection into the line leading into the manifold. A preferred solvent utilized in the Harlo equipment or the injection is:

60% isopropyl alcohol
38% water
2% toluene or other alkyl benzenes

The present composition, known as the M.S.X. composition, may be introduced as follows:

The introduction of the M.S.X. compound into the combustion chamber when using the water-alcohol mixutre in the "Harlo Device" further enhances the operation. This results from being able to actually control the amount of catalytic material actually being introduced. By a very carefully selected orifice, one milliliter of the mixture is introduced for every mile traveled. In this way, at no time is a heavy concentration of the "fuel saver" or "energy extender" introduced into the combustion chamber to be wasted. By the very makeup of the compound and its volatility, it is introduced in the usable vapor phase.

As a result of utilization of the present composition, it has been found by tests that improvements in fuel economy between 10 and 25 percent have been experienced. The variable range is due to make, condition, size of the vehicle, coupled with the variations in road conditions that drivers have at city versus highway driving, etc. It can be further stated that a mean average mileage improvement for all tests is about 15%. Based currently on the Canadian price per gallon of about $1 per gallon, this means that about 15 cents out of every dollar can be effected in savings.

EXAMPLE 1

Composition

Toluene and isopropyl alcohol were mixed together. The trinitrophenol (picric acid) was introduced to this mixture and stirred gently. It dissolved completely when left overnight. The nitrobenzene was added with a slight stir. The ferrous sulfate was dissolved in a small amount of hot water (a maximum of one-half gallon for one hundred gallon mix) and added to the mixture.

The product was allowed to stand overnight. It was inspected for any sediment settling, after Quality Control Tests were made and the product passed. It was released for ultimate packaging.

The water usually present with the trinitrophenol (picric acid) was taken into consideration in the formulation of this product.

EXAMPLE 2

The Harlo MotorKlean Fuel System was originally designed for a mixture in alcohol and water which feeds by a bottle-like container into the intake manifold and combustion chamber of the engine. The present invention utilizes a system known as the Harlo MotorKlean Fuel System (manufactured by Harlo Repower Ltd., Clearbrook, B.C., Canada), which is under license to N.R.G. International, Inc., West Orange, New Jersey 07052, and modifies the injection fuel to include 60% isopropyl alcohol, 38% water, and 2% toluene calculated by volume as a solvent to which is added an appropriate mixture of the active ingredients, picric acid and ferrous sulfate. A pre-packaged injection container thus is substituted for the known alcohol-water mix of the original Harlo Injection System.

The active ingredients are assimilated with the solvents above in a similar manner to the preparation in Example 1 and a bulk material may be made and the individual Harlo containers filled with the completed composition.

Actual test results comparing the results using the M.S.X. composition in a Harlo Injection System is given in Table 1 below.

TABLE I

| Vehicle | Total Mileage | Baseline MPG | Average MPG | Increase MPG |
|---|---|---|---|---|
| 1976 GMC, V-8 | 1703 | 12.06 | 13.51 | 12% |
| 1976 GMC, V-8 | 2753 | 12.06 | 15.47 | 28% |
| 1976 GMC, V-8 truck | 997 | 12.06 | 13.58 | 12.6% |

EXAMPLE 3

In a standard dynamometer test utilizing different makes of cars, emission tests for hydrocarbon and carbon monoxide were measured as shown in Table II. The "before" and "after" indicate before and after employment of the Harlo Device with the present additive composition.

TABLE II

| Vehicle | | Emissions HC | | CO | |
|---|---|---|---|---|---|
| | | Before | After | Before | After |
| 1964 Chevrolet 6-cylinder | Idle | 330 | 160 | 5% | .9% |
| | 2500 | 200 | 100 | 1 | .5 |
| 1974 Ford 4-cylinder | Idle | 110 | 48 | 1.2 | .15 |
| | 2500 | 90 | 35 | .25 | .08 |
| 1969 Chrysler V-8 | Idle | 250 | 150 | 7.0 | 3.0 |
| | 2500 | 100 | 100 | 2.0 | 1.0 |
| 1973 Ford V-8 | Idle | 325 | 250 | 9.0 | 1.5 |
| | 2500 | 100 | 70 | 1.0 | .7 |
| 1974 Chevrolet V-8 (½ ton) | Idle | 1100 | 150 | 1.5 | .5 |
| | 2500 | 200 | .80 | .25 | .25 |
| 1972 Pontiac V-8 | Idle | 1700 | 150 | 3.0 | .1 |
| | 2500 | 100 | 75 | .1 | .2 |
| 1971 Ford Comet, 6-cyl | Idle | 200 | 150 | 8.0 | 1.5 |
| | 2500 | 175 | 125 | 6.0 | 1.0 |
| 1971 Pontiac V-8 | Idle | 1200 | 800 | 5.0 | 5.0 |
| | 2500 | 400 | 400 | .5 | .25 |
| 1972 Cadillac V-8 | Idle | 110 | 75-50 | 1.5 | .4 |
| | 2500 | 75 | 50 | .4 | .2 |

TABLE II-continued

| Vehicle | | Emissions | | | |
|---|---|---|---|---|---|
| | | HC | | CO | |
| | | Before | After | Before | After |
| 1971 Chevrolet V-8 | Idle | 1000 | 150 | 2.0 | 1.5 |
| | 2500 | 200 | 50 | 1.5 | .2 |

I claim:

1. A fuel additive for internal combustion and diesel engines consisting of an active ingredient formulation comprising a mixture of picric acid and ferrous sulfate in a relationship of picric acid:ferrous sulfate of about 17:1 to 70:1 in a mixed solvent of lower alcohol, toluene, and water.

2. The additive according to claim 1 wherein the additive is in atomized form for introduction into the engine.

3. The additive according to claim 1 which additionally contains a minor amount of nitrobenzene as a solvent.

4. The additive according to claim 1 wherein the solvent contains about 60% by volume of isopropyl alcohol, 2% by volume of toluene, and 38% by volume of water.

5. An additive for direct bulk addition to gasoline and diesel fuel containers which comprises per imperial gallon:

Ferrous sulfate: 0.1-0.2 g
Trinitrophenol: 3.5-7.0 g
Nitrobenzene: 0.1-2.0 g
Toluene: 3.37kg - 1.12kg
Isopropyl alcohol: 1.12kg - 3.37 kg 6. The additive according to claim 5 wherein the maximum amount in one imperial gallon is:

Ferrous sulfate: 0.2 g
Trinitrophenol: 3.5 g
Nitrobenzene: 0.16 g
Toluene: 3.37 kg
Isopropyl alcohol: 1.12 kg 7. A method for treating fuels for gasoline and diesel engines which comprises adding thereto to each imperial gallon a formulation comprising a mixture of picric acid and ferrous sulfate in a relationship of picric acid: ferrous sulfate of about 17:1 to 70:1 in a mixed solvent of lower alkanol, toluene, and water.

8. The method according to claim 7 wherein the additive is in atomized form for introduction into the engine.

9. The method according to claim 7 wherein the additive additionally contains a minor amount of nitrobenzene as a solvent.

10. The method according to claim 7 wherein the solvent contains about 60% by volume of isopropyl alcohol, 2% by volume of toluene, and 38% by volume of water.

* * * * *